US010831977B1

(12) United States Patent
Gheith et al.

(10) Patent No.: US 10,831,977 B1
(45) Date of Patent: Nov. 10, 2020

(54) CURVILINEAR MASK MODELS (71) Applicant: GLOBALFOUNDRIES INC., Grand Cayman (KY)

(72) Inventors: Mohamed Elsayed Mohamed Lotfy Gheith, Gansevoort, NY (US); Ian Stobert, Hopewell Junction, NY (US); Ayman Hamouda, Milpitas, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/429,536

(22) Filed: Jun. 3, 2019

(51) Int. Cl.
*G06F 30/398* (2020.01)
*G03F 1/70* (2012.01)
*G06N 20/00* (2019.01)
*G06F 119/18* (2020.01)

(52) U.S. Cl.
CPC .............. *G06F 30/398* (2020.01); *G03F 1/70* (2013.01); *G06N 20/00* (2019.01); *G06F 2119/18* (2020.01)

(58) Field of Classification Search
CPC ................................ G06F 30/398; G03F 1/70
USPC ........................................................ 716/53
See application file for complete search history.

(56) References Cited

U.S. PATENT DOCUMENTS

| 8,812,999 | B2 | 8/2014 | Liu et al. | |
|---|---|---|---|---|
| 8,863,044 | B1* | 10/2014 | Casati | G06F 30/398 716/52 |
| 9,547,745 | B1* | 1/2017 | Juang | G06F 30/398 |
| 2003/0082463 | A1* | 5/2003 | Laidig | G03F 1/68 430/5 |
| 2007/0006115 | A1* | 1/2007 | Nojima | G06F 30/398 438/703 |
| 2010/0157315 | A1* | 6/2010 | Bischoff | G01B 11/24 356/612 |
| 2014/0189614 | A1* | 7/2014 | Liu | G03F 1/70 716/53 |
| 2016/0055122 | A1* | 2/2016 | Koranne | G02B 6/12011 703/2 |
| 2016/0136899 | A1* | 5/2016 | Koranne | B29C 64/386 700/98 |
| 2016/0378902 | A1* | 12/2016 | Graur | G06F 30/39 716/52 |
| 2019/0146455 | A1* | 5/2019 | Beylkin | G03F 1/36 700/97 |

(Continued)

OTHER PUBLICATIONS

Watanabe et al. "E-beam data preparation method for forming ultra fine curved patterns in silicon microphotonic circuit", Microprocesses and Nanotechnology Conference, (2005), 2 pages.

(Continued)

*Primary Examiner* — Suchin Parihar
(74) *Attorney, Agent, or Firm* — Francois Pagette; Andrew M. Calderon; Roberts Calderon Safran & Cole, P.C.

(57) ABSTRACT

The present disclosure generally relates to semiconductor structures and, more particularly, to curvilinear mask models and methods of manufacture. The method includes: calibrating, by a computing device, machine learning models for silicon photonics applications; retargeting, by the computing device, designs in a layout for the silicon photonics applications by applying the machine learning models to the designs; and repairing, by the computing device, unmatching shapes in the retargeted designs to generate final curvilinear mask shapes for the silicon photonics application.

20 Claims, 7 Drawing Sheets

(56) References Cited

U.S. PATENT DOCUMENTS

| | | | |
|---|---|---|---|
| 2019/0147134 A1* | 5/2019 | Wang | G03F 1/36 |
| | | | 716/52 |
| 2020/0050099 A1* | 2/2020 | Su | G06K 9/4604 |
| 2020/0051781 A1* | 2/2020 | Fujimura | H01J 37/3175 |

OTHER PUBLICATIONS

Gek Soon Chua et al. "Optimization of mask shot count using MB-MDP and lithography simulation",Proc. of SPIE vol. 8166, 2011, 11 pages.

\* cited by examiner

CURVILINEAR MASK MODELS

FIELD OF THE INVENTION

The present disclosure generally relates to semiconductor structures and, more particularly, to curvilinear mask models and methods of manufacture.

BACKGROUND

In silicon photonics manufacturing, sub-nanometer (nm) accuracy is not as critical as uniformity and capability in compensating for non-lithography effects, e.g., etch and oxidation effects. This is because the size of components in silicon photonics application are relatively larger compared to other technologies, e.g., CMOS technologies.

However, due to the optical characteristics of silicon photonics components, it can be desirable to design the photonics structures using free form curvilinear shapes rather than orthogonal shapes with only vertical and horizontal edges, as is usually done in traditional CMOS design. Furthermore, in order to maintain the desirable optical characteristics of the waveguides and other devices used in photonic applications, it can be desirable to maintain the curvilinear polygon representations through various steps of data processing between design and mask making. Maintaining curvilinear representations throughout the steps of the tape-out flow is a method to ensure that the final shapes on the mask and silicon closely match the design intent of the photonics designs.

Curvilinear designs are incompatible with many standard optical proximity correction (OPC) algorithms unless the curvilinear designs are formatted to match standard OPC algorithms. However, conventional correction treatments have certain drawbacks. For example, under the Manhattanization technique, curved features are treated by breaking them down into vertical and horizontal edge fragments, e.g., a staircase shaped. These rigid shapes generated by the Manhattanization technique can cause design rule check (DRC) violations and OPC challenges for the masks used in silicon photonics manufacturing. Additionally, losing the curvilinear nature of the intended designs can have a negative impact with respect to the optical functional performance of the silicon photonics components due this loss of design fidelity, etch bias discontinuities and DRC compliance issues, amongst other issues. Accordingly, the Manhattanization of curvilinear designs induces complexities in the mask tape-out flow for silicon photonics applications.

There are alternative approaches to OPC that can support curvilinear designs, like inverse lithography techniques (ILT). These methods are capable of correcting curvilinear designs for optical proximity effects and generating the design free form mask shapes. However, these correction techniques such as ILT also have drawbacks. These drawbacks include high computational complexity, thereby making it relatively challenging and expensive to support full chip layouts. Further, the known techniques are not well suited to compensate for non-lithographic proximity corrections, e.g., etch proximity correction.

SUMMARY

In an aspect of the disclosure, a method comprises: calibrating, by a computing device, machine learning models for silicon photonics applications; retargeting, by the computing device, designs in a layout for the silicon photonics applications by applying the machine learning models to the designs; and repairing, by the computing device, unmatching shapes in the retargeted designs to generate final curvilinear mask shapes for the silicon photonics application.

In an aspect of the disclosure, a computer program product comprises: a computer readable storage medium having program instructions embodied therewith, and the program instructions are readable by a computing device to cause the computing device to: generate a design library of curvilinear test patterns for silicon photonics applications; correct the curvilinear test patterns to compensate for corrections; calibrate machine learning models using the corrected curvilinear test patterns to mimic outputs of the corrected curvilinear test patterns; retarget designs in a layout by applying the machine learning models; scan the retargeted designs for unmatching shapes; and generate final mask shapes from the retargeted designs.

In an aspect of the disclosure, a system comprises: a CPU, a computer readable memory and a computer readable storage media; first program instructions to collect test patterns from a design library; second program instructions to compensate the test patterns for corrections; third program instructions to train a curvilinear correction model using the compensated test patterns; fourth program instructions to retarget designs in a layout by applying the curvilinear correction model to the designs; and fifth program instructions to repair retargeted designs containing unmatching shapes, wherein the first, second, third, fourth and fifth program instructions are stored on the computer readable storage media for execution by the CPU via the computer readable memory.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure generally relates to semiconductor structures and, more particularly, to curvilinear mask models and methods of manufacture. In embodiments, the structures and processes described herein enable calibration and process correction flows to generate curvilinear designs for silicon photonics mask applications having both optical proximity correction (OPC) and etch process compensation (EPC). Advantageously, this ability to compensate for both OPC and EPC provides a practical application to mask writers to receive a freeform lithographic and non-lithographic compensation solution that preserves the free form nature of designs needed for silicon photonics applications.

The generation of curvilinear mask solutions has a relatively faster turnaround (simulation) time compared to other technologies like inverse lithography technique (ILT) flows, for full chip layouts. This is because the structures and processes described herein do not have the drawbacks of conventional lithography correction techniques. For example, Manhattanizing curvilinear designs creates rigid shapes, e.g., staircase shaped short edges, which can cause a lot of design rule checks (DRC) and OPC concerns in silicon photonics manufacturing. Other correction techniques, like ILT, have relatively slow simulation time, which can be expensive and prohibitive for correcting full chip layouts. Further, ILT does not compensate for etch process biases.

The structures and processes described herein avoid the problems of Manhattanization and ILT by implementing a curve transformation model to generate curvilinear designs for mask shapes. In embodiments, a library of curvilinear test patterns is generated and used to calibrate a curve transformation model which mimics the output of OPC or etch proximity algorithms. This enables a mask tape-out flow of a calibrated curve transformation model to generate final curvilinear mask shapes in a single simulation iteration, thereby reducing total turnaround time, which allows for the support of full chip designs.

The structures and processes described herein provide for a method to generate a library of curvilinear test patterns which is used to calibrate a curve transformation model to mimic an output of OPC or etch correction algorithms. The method further includes the step of enabling a mask tape-out flow using the calibrated curve transformation model to generate final curvilinear mask shapes in a single simulation iteration. In embodiments, additional steps include compensating for OPC and EPC.

Figure 1:
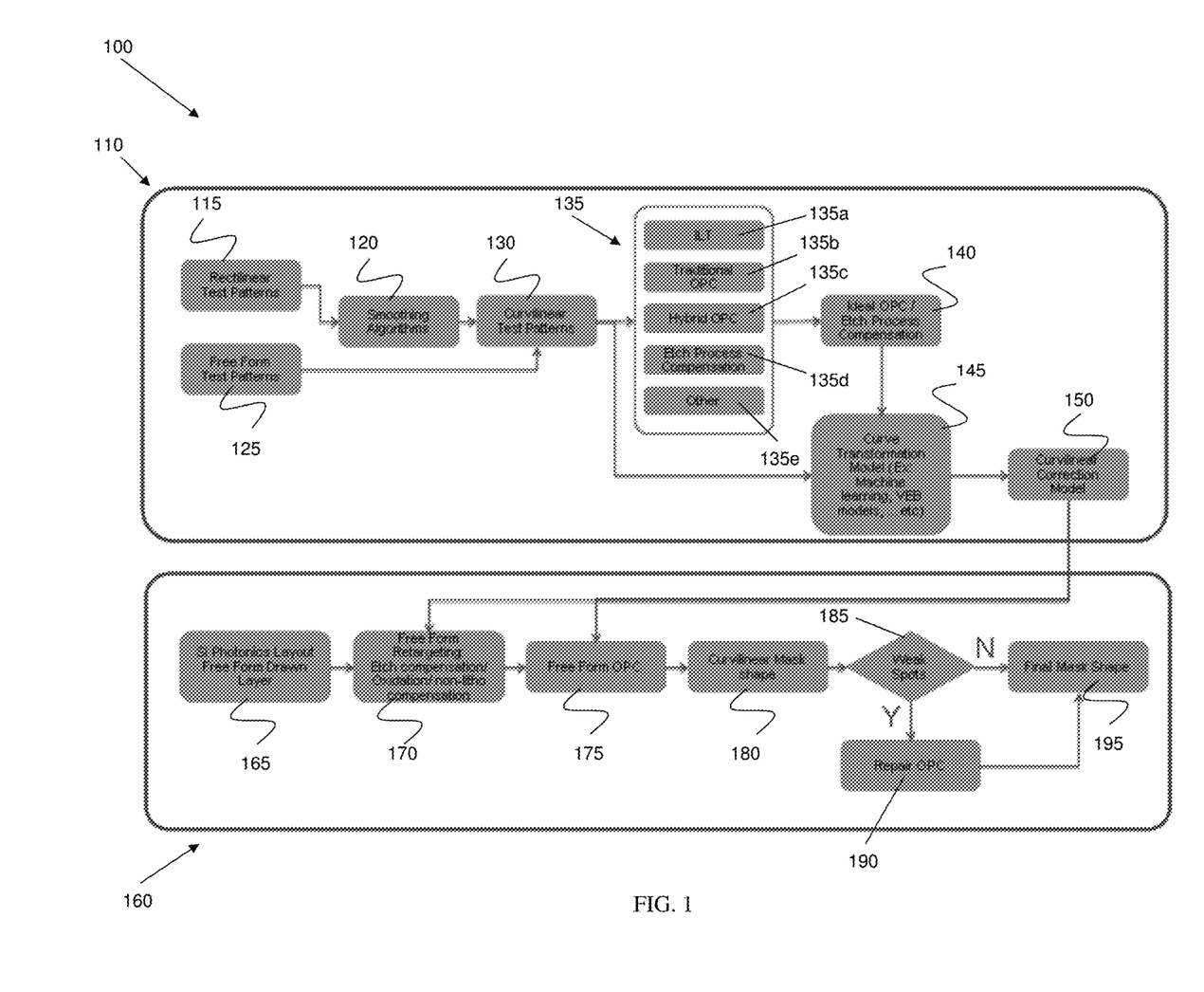
FIG. 1 shows a flow diagram for calibration and process correction processes for generating curvilinear mask models, amongst other features, in accordance with aspects of the present disclosure.

FIG. 1 illustrates a flow diagram 100 for forming free form photolithography masks, i.e., masks having curvilinear designs, for silicon photonics wafer patterning. In embodiments, the flow diagram 100 first builds and calibrates a curvilinear correction model in the calibration process 110 and then adjusts the curvilinear correction model for process corrections in the process correction flow 160. The calibration process 110 begins with defining test patterns to teach (calibrate) the curvilinear correction model. At step 115, rectilinear test patterns for photolithography masks are collected to define simple test patterns which may be desirable. These simple rectilinear test patterns can be relatively simple rectilinear designs, e.g., line space patterns, polygons or staircase shaped short edges, amongst other examples. More specifically, the simple rectilinear designs can include any design having any combination of lines and spaces.

At step 120, the rectilinear test patterns are smoothed using various smoothing algorithms to modify the rectilinear test patterns into a curvilinear nature. In embodiments, the smoothing algorithms can include Gaussian convolution algorithms with a B-Spline basis function, amongst other examples. The smoothing algorithms at step 120 allow for the rectilinear test patterns to be modified into smoothed patterns, i.e., having curved and curvilinear shapes, as opposed to simple shapes present in the original rectilinear test patterns.

In addition to the collection of rectilinear test patterns at step 115 to define test patterns for the curvilinear correction model, the calibration process 110 also collects free form test patterns at step 125. In embodiments, the free form test patterns are initially drawn to have curvilinear features, i.e., patterns having curved and curvilinear shapes. At step 130, the smoothed patterns smoothed by the smoothing algorithms of step 120 and the free form test patterns of step 125 are used to generate a design library of curvilinear test patterns which are used to calibrate a curve transformation model to mimic an output of OPC or etch algorithms. In embodiments, curvilinear test patterns are any patterns which comprise curved shapes in addition to simple linear shapes. In this way, the test patterns are rectilinear shapes and curvilinear shapes.

At step 135, the curvilinear test patterns are corrected to generate a relatively best OPC/process correction model for test patterns. In embodiments, the applicable correction techniques may include ILT for 2D patterns at step 135a, traditional OPC processes for 1D patterns at step 135b, hybrid OPC processes which comprise a combination of traditional OPC processes and ILT at step 135c, EPC processes comprising bias tables/etch models at step 135d, and other correction techniques at step 135e. Accordingly, the relatively best correction technique from the available correction techniques 135a, 135b, 135c, 135d, 135e, is implemented depending on the specific curvilinear test pattern. In this way, the test patterns are corrected using an optical proximity correction, a hybrid optical proximity correction, an etch process compensation or an inverse lithography.

The corrective treatment of the curvilinear test patterns results in test patterns at step 140 having ideal OPC/etch process compensation, i.e., ideal test patterns. The ideal test patterns of step 140 are then implemented into a curve transformation model at step 145 to model an ideal output for silicon photonic mask applications. In embodiments, the curve transformation model implements various modeling techniques to output the ideal model. These techniques may include machine learning or etch bias modeling, e.g., a compact model form that can translate one curved layout into another curved layout, amongst other examples. In one embodiment, etch bias modeling techniques can be used to build an efficient empirical model that can act as a translation function to map any input contour to a desired output contour. Hence, the disclosure uses a model form that is empirical in nature, relatively computationally efficient to use and sufficiently accurate for the final critical dimension tolerances required by photonics device specifications.

In conventional mask flows, masks are modeled from measurement data obtained from the wafer. In comparison, the curve transformation model at step 145 is trained to match ideal curvilinear patterns which have been compensated for OPC and EPC, i.e., treated with correction techniques 135a, 135b, 135c, 135d, 135e. Based on the training at step 145, a curvilinear correction model for ideal mask shapes is generated at step 150.

The curvilinear correction model of step 150 is capable of jumping from an inputted curvilinear contour to an ideal curvilinear mask shape output required to be printed on a mask blank for a specific silicon photonics application in a single simulation iteration, i.e., one-step correction. In this way, the curvilinear correction model allows for a much faster turnaround time compared to other correction techniques, e.g., faster than ILT, while still being able to compensate for OPC and EPC.

Once the calibration process 110 is completed, the process correction flow 160 is implemented using the curvilinear correction model of step 150 generated by the calibration process 110. At step 165, the process correction flow 160 begins with an initial silicon photonics layout having the actual designs which come in free form curvilinear format. At steps 170 and 175, a free form retargeting of the designs in the silicon photonics layout is implemented by applying the curvilinear correction model of step 150 to the silicon photonics layout of step 165.

Selection of the retargeting steps 170 and/or 175 is dependent upon the corrective technique applied in step 135 of the calibration process 110. For example, if an EPC corrective process was implemented at step 135d, the silicon photonics layout will be retargeted using EPC corrective processes. Alternatively, if an OPC corrective process was implemented at step 135b, the silicon photonics layout will be retargeted using OPC corrective processes. If both EPC and OPC corrective processes were applied to the curvilinear correction model of step 150, both retargeting steps 170 and 175 are performed on the free form designs. In embodiments, other corrective techniques may include compensation for critical dimension changes due to oxidation and other non-lithographic process biases.

Regardless of which retargeting step is selected, there will only be a need for a single iteration simulation using the curvilinear correction model 150. For example, if retargeting step 170 is selected, the retargeting which occurs using the curvilinear correction model 150 is performed during a single iteration simulation. Accordingly, because only a single iteration simulation is needed, there is no cost function or convergence criteria, i.e., a relatively very fast simulation time is provided. The relatively very fast simulation time facilitates modeling to occur for full chip layouts. Based on the retargeting at steps 170, 175, a curvilinear mask shape for ideal mask shapes is generated at step 180.

The curvilinear mask shape of step 180 is checked at step 185 for any weak spots, i.e., non-matching shapes at locations in the curvilinear mask shape. In embodiments, if weak spots are detected, i.e., "Yes" represented by the letter Y, the process correction flow 160 goes to repair step 190 to repair the weak spots. The repair technique implemented at step 190 is dependent upon on the cause of the non-matching shapes. For example, if the reason for the non-matching shapes is due to a contour in the curvilinear mask shape not being ideal, a repair process like EPC can be implemented. In this way, the repairing the unmatching shapes comprises an etch process compensation.

Alternatively, if the reason for the non-matching shapes is due to an undesirable line spacing in the curvilinear mask shape, a repair process, e.g., ILT, can be implemented. In embodiments, the repair process of step 190 is preferably not performed on the entire curvilinear mask shape; instead, the repair process is applied at a local location where the non-matching (undesirable) shapes are present. After the repair process at step 190, or if the curvilinear mask shape did not have any weak spots, i.e., "No" represented by the letter N, a final mask shape for silicon photonics application is obtained at step 195. In this way, the structures and processes described herein provide for calibrating machine learning models for silicon photonics applications through the calibration process 100. Further, there is retargeting designs in a layout for the silicon photonics applications by applying the machine learning models to the designs at steps 170, 175. Additionally, there is a repairing at step 190 of unmatching shapes in the retargeted designs to generate final curvilinear mask shapes for the silicon photonics application at step 195.

The final mask shape generated by the flow diagram 100 provides a practical application to mask writers at a photolithography mask house. Specifically, due to the relatively larger sized components in silicon photonics applications compared to other technologies, e.g., CMOS technologies, masks with free form (curvilinear) designs can now be implemented. Accordingly, the final mask shape generated by the flow diagram 100 allows mask writers to receive a free form non-lithographic compensation mask solution that preserves the free form nature of the designs. The mask writers can print the final mask shape onto a mask blank and use the printed mask for lithography processes in silicon photonics manufacturing.

Figure 2:
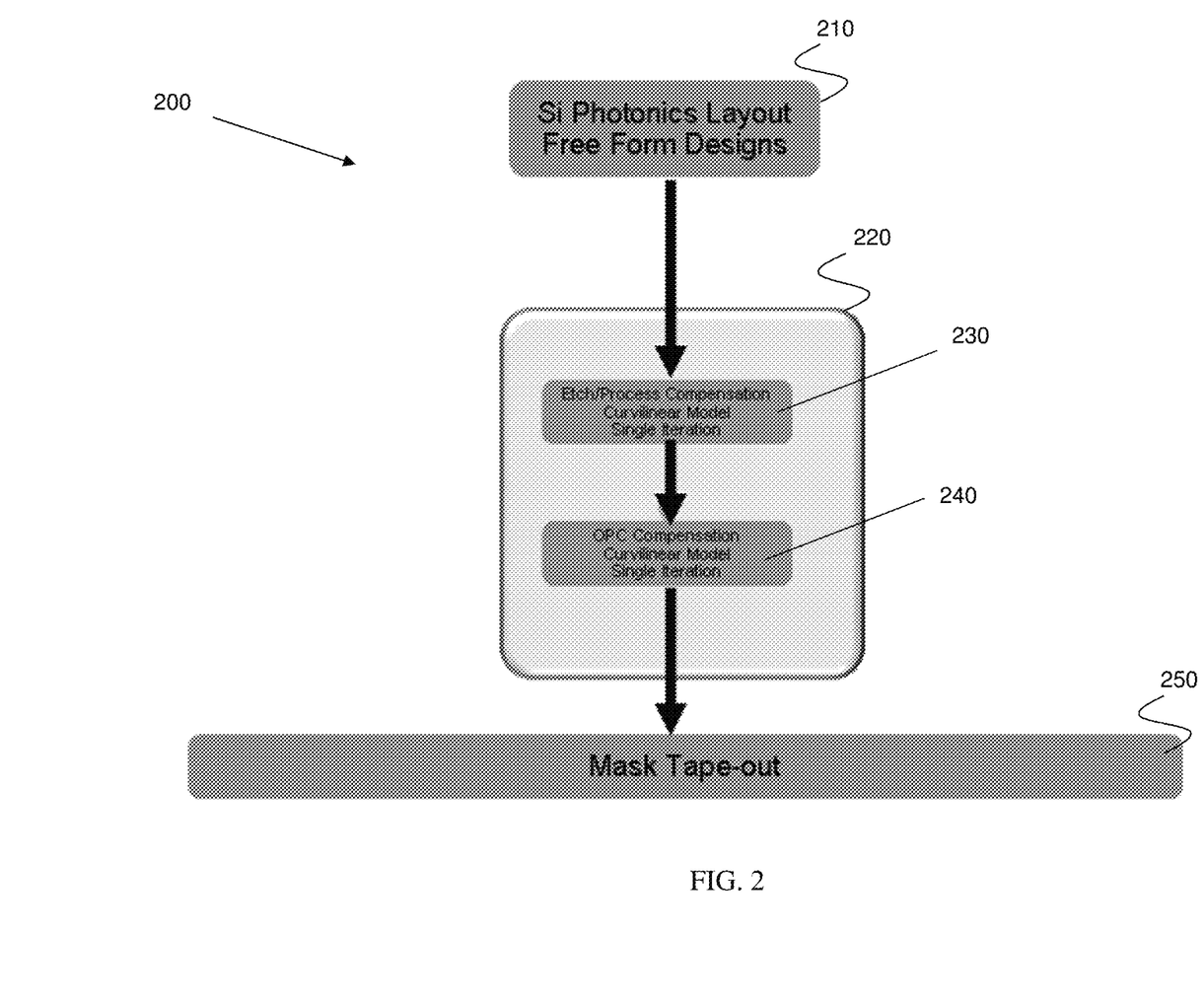
FIG. 2 shows a flow diagram for a curvilinear mask model tape-out flow, amongst other features, in accordance with aspects of the present disclosure.

FIG. 2 shows a simplified curvilinear mask tape-out flow 200 in accordance with aspects of the present disclosure. In embodiments, the mask tape-out flow 200 begins at step 210 with a silicon photonics layout containing actual designs in free form, i.e., curvilinear shapes. At step 220, a curvilinear correction model is applied to retarget the free form designs at steps 230 and/or 240 in the silicon photonics layout.

Selection of the retargeting steps 230 and/or 240 is dependent upon which corrective techniques were applied to generate the curvilinear correction model. For example, if an EPC corrective process was implemented, the silicon photonics layout will be retargeted using EPC corrective processes at step 230. Alternatively, if an OPC corrective process was implemented, the silicon photonics layout will be retargeted using OPC corrective processes at step 240. If both EPC and OPC corrective processes were applied to the curvilinear correction model, both retargeting steps 230 and 240 are performed. Once retargeting is completed and the generated curvilinear mask shape does not have any weak spots, a final mask shape is outputted at mask tape-out step 250.

The curvilinear mask tape-out flow 200 provides various advantages compared to conventional correction processes. Specifically, conventional processes are unable to provide the free form non-lithographic compensation solution provided by the structures and processes of the present disclosure. Instead, conventional correction processes rely on techniques like Manhattanization and ILT in attempt to correct free form designs, i.e., curvilinear designs. However, these techniques cause several disadvantages, including loss of design fidelity, bias discontinuities and DRC compliance issues, amongst other disadvantages. This is because techniques like Manhattanization break down the free form designs into rigid shapes, thereby losing the free form nature of the intended designs. Additionally, techniques such as ILT are unable to compensate for EPC processes, and are relatively slower than the processes of the present disclosure. In this way, conventional correction processes can be prohibitively expensive to support full chip layouts because of their slower speed.

Figure 3:
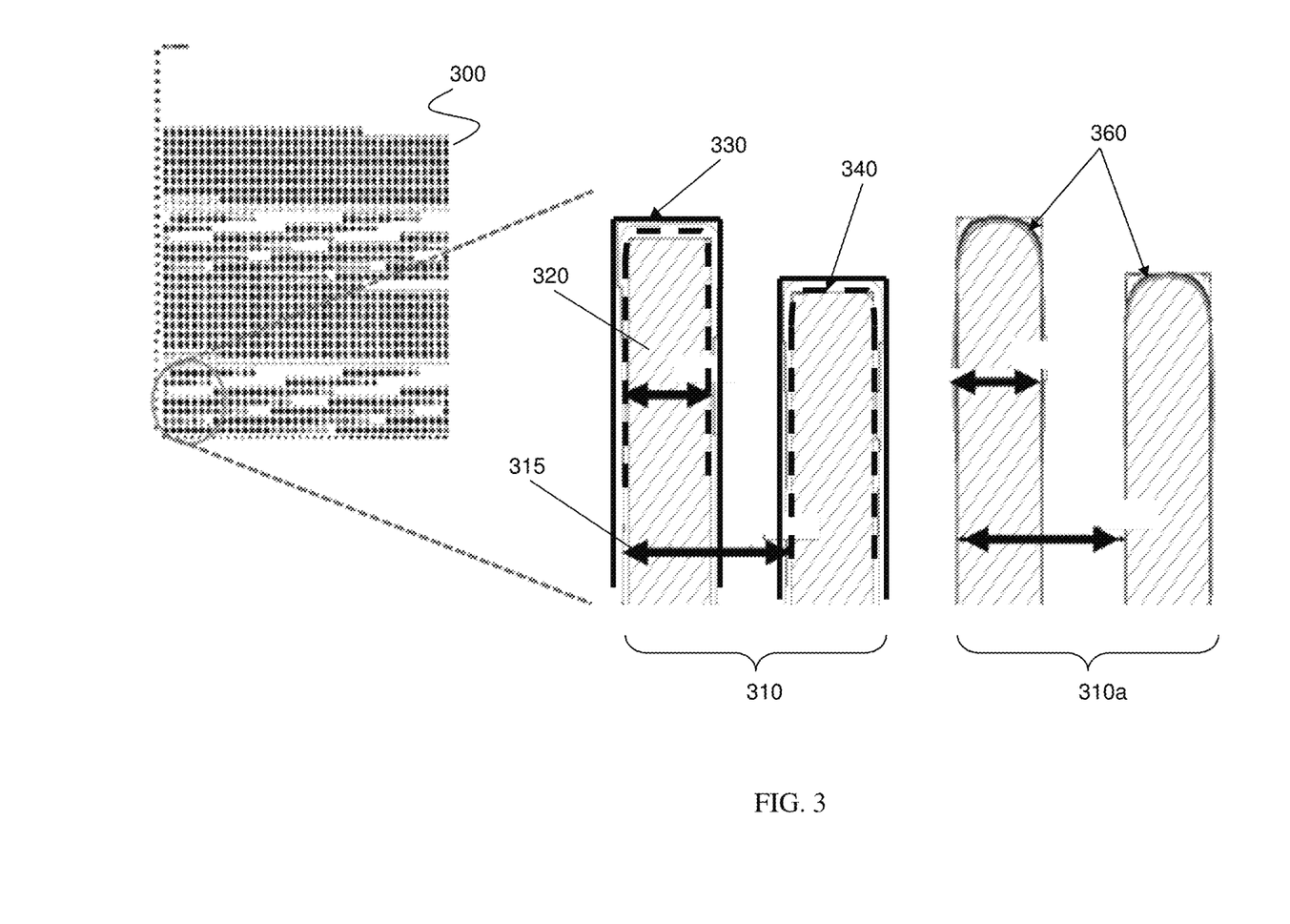
FIGS. 3-6 show curvilinear designs, amongst other features, in accordance with aspects of the present disclosure.

FIG. 3 illustrates a test pattern 300 which can be used in calibration processes, i.e., calibration process 110, to generate a curvilinear correction model. In embodiments, the mask shapes 310 are simple rectilinear designs, i.e., line space patterns, as indicated by the space 315. Mask shapes 310 comprise a target layer 320, which can be treated with conventional correction processes, e.g., OPC, as represented by the solid line 330. Additionally, mask shapes 310 can be treated with the curvilinear correction model of step 150, as represented by the dashed line 340. Mask shapes 310a represent mask shapes treated with the curvilinear correction model to obtain curvilinear features 360. As shown in FIG. 3, the curvilinear correction model of the present invention allows mask shapes to be corrected to have curvilinear features 360 without the drawbacks of conventional correction processes.

Figure 4:
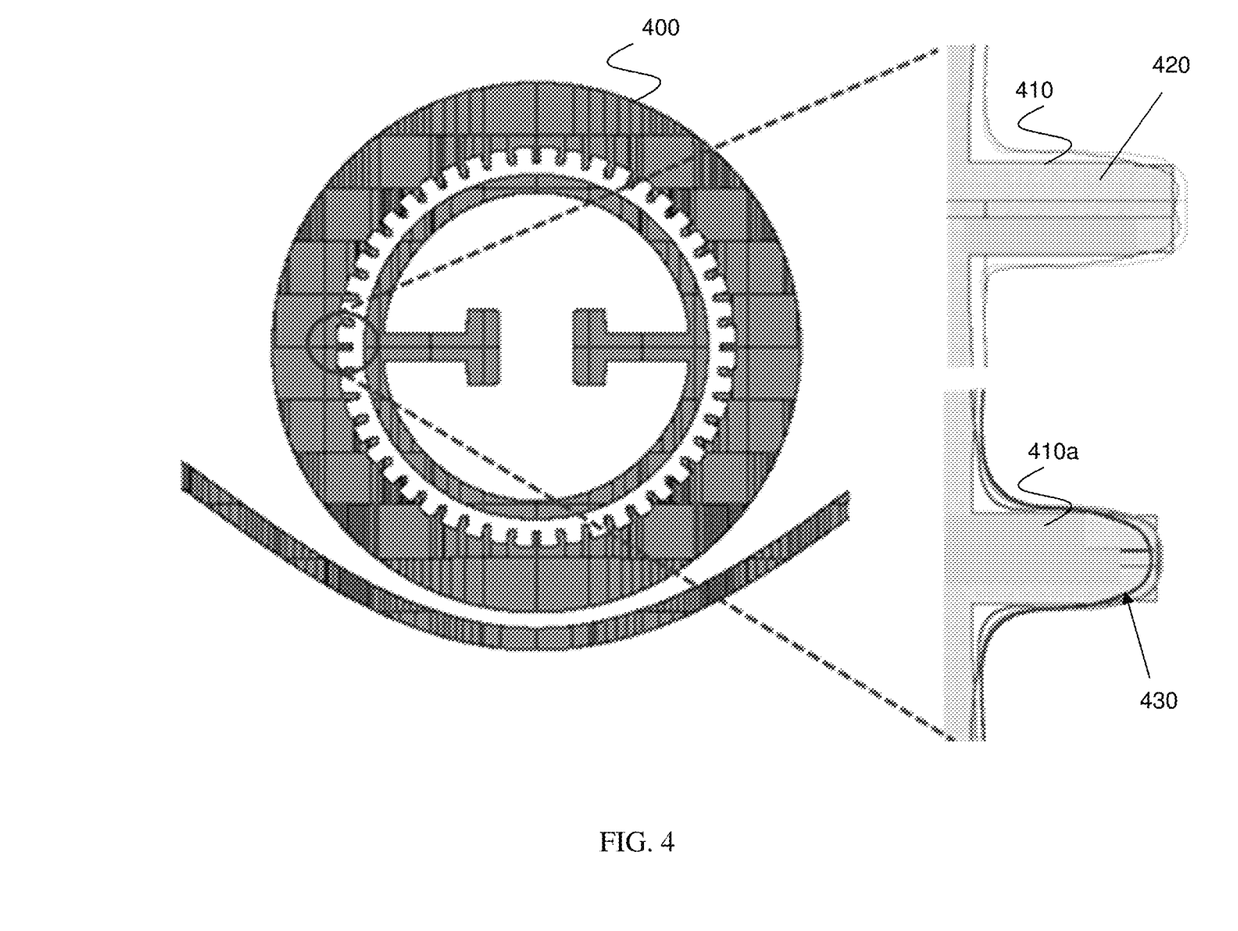
Figure 5:
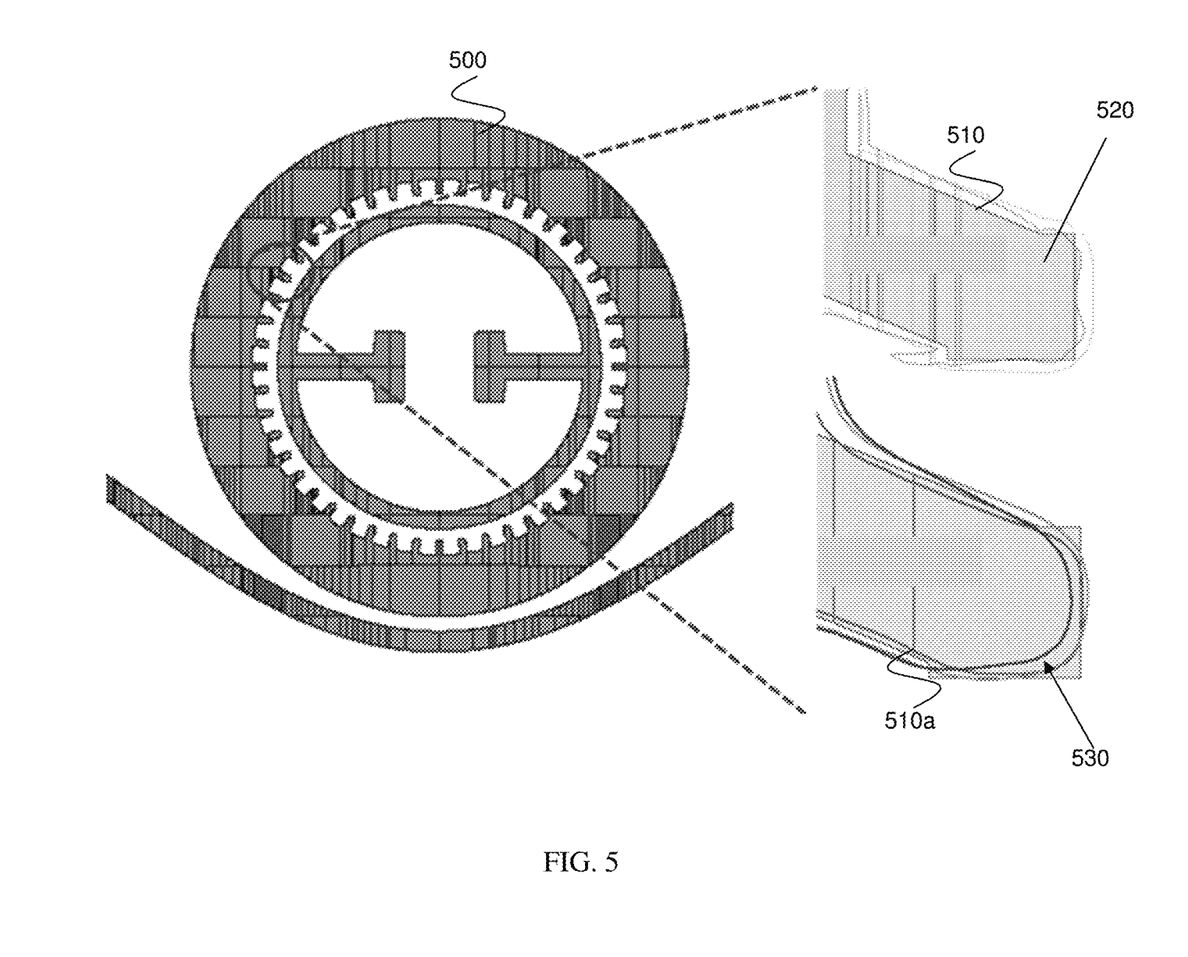
Figure 6:
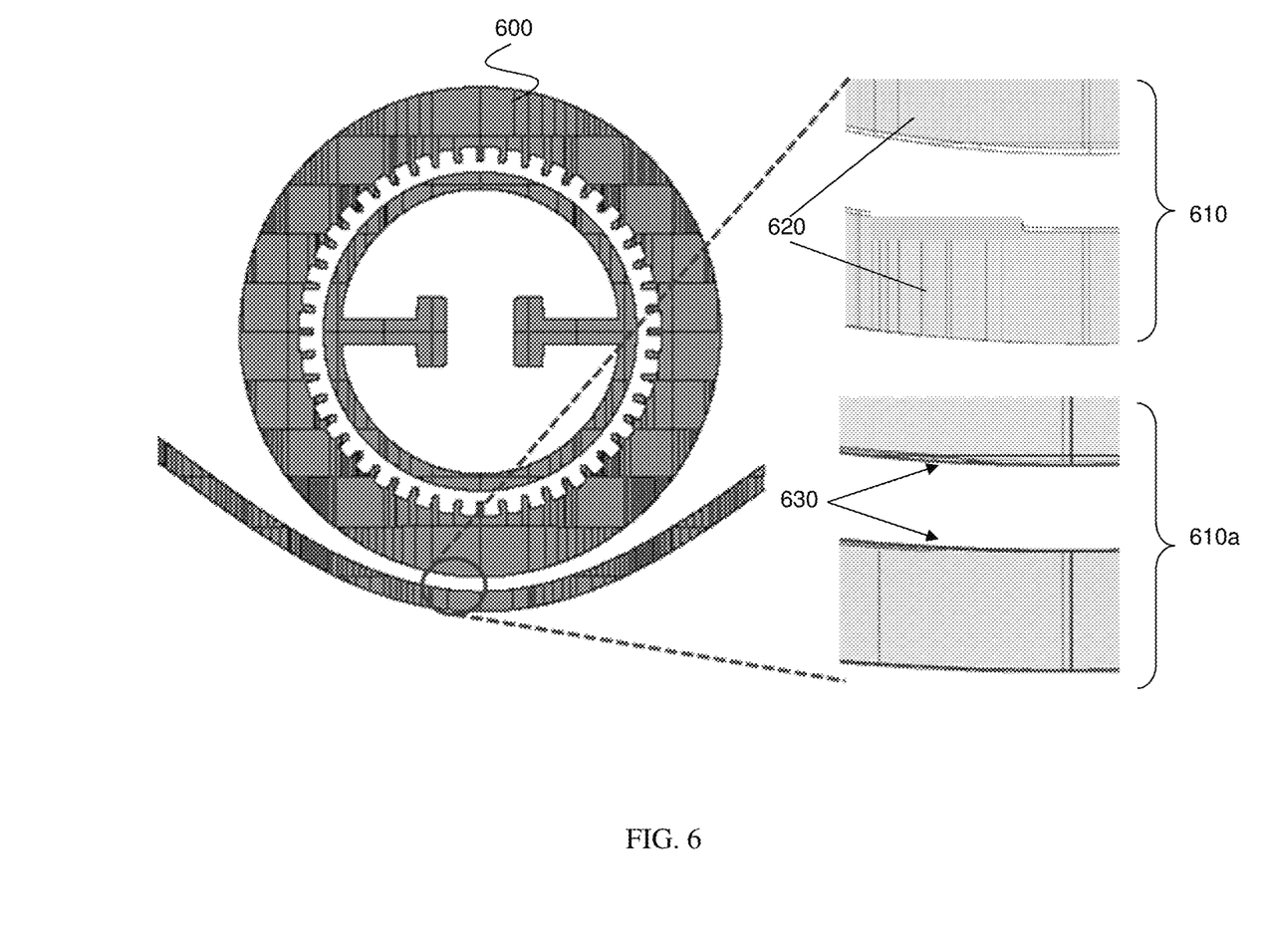

FIGS. 4-6 illustrate various simulation results for mask shapes which are modeled by the processes described herein. For example, FIG. 4 illustrates photolithograph mask 400 to be used for silicon photonics manufacturing. In embodiments, mask 400 includes mask shapes 410, comprising a target layer 420 which is targeted to be treated for curvilinear features. Mask shapes 410*a* show the target layer 420 treated with the curvilinear correction model to generate curvilinear features 430.

In FIG. 5, photolithograph mask 500 includes mask shapes 510 comprising a target layer 520 which is targeted to be treated for curvilinear features. Mask shapes 510*a* show the target layer 520 treated with the curvilinear correction model to generate curvilinear features 530. In FIG. 6, photolithograph mask 600 includes mask shapes 610 comprising a target layer 620 which is targeted to be treated for curvilinear features. Mask shapes 610*a* show the target layer 620 treated with the curvilinear correction model to generate curvilinear features 630.

The masks 400, 500, 600 will undergo a check for weak spots. If weak spots are detected, the masks 400, 500, 600 will undergo a repair process at a local site where the weak spots exists in the mask of the masks 400, 500, 600. Once repaired, the masks 400, 500, 600 will be sent to mask houses to be printed on mask blanks.

As will be appreciated by one of ordinary skill in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more computer readable storage medium(s) having computer readable program code embodied thereon.

The computer readable storage medium (or media) having computer readable program instructions thereon are physical instructions which causes one or more computing processors to carry out aspects of the present disclosure. The computer readable storage medium can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following non-transitory signals: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. The computer readable storage medium is not to be construed as transitory signals per se; instead, the computer readable storage medium is a physical medium or device which stores the data. The computer readable program instructions may also be loaded onto a computer, for execution of the instructions, as shown in FIG. 7.

Figure 7:
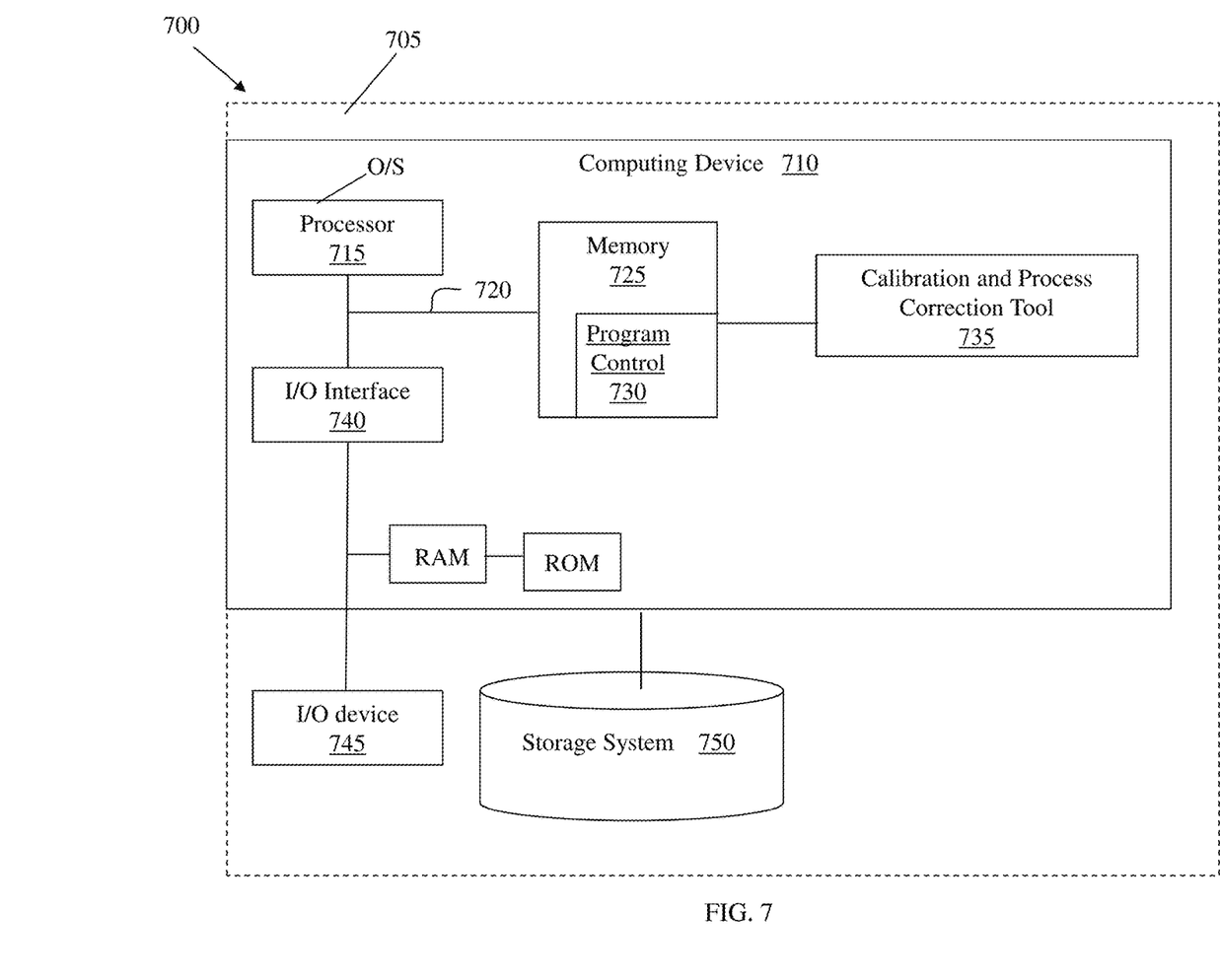
FIG. 7 shows an illustrative infrastructure for implementing curvilinear mask modeling in accordance with aspects of the invention.

FIG. 7 shows a computer infrastructure 700 for implementing the steps in accordance with aspects of the disclosure. To this extent, the infrastructure 700 can implement the calibration process 110 and the process correction 160 to generate the final mask shape 195 of FIG. 1 (or those as shown in FIGS. 4-6). The infrastructure 700 includes a server 705 or other computing system that can perform the processes described herein. In particular, the server 705 includes a computing device 710. The computing device 710 can be resident on a network infrastructure or computing device of a third-party service provider (any of which is generally represented in FIG. 7).

The computing device 710 includes a processor 715 (e.g., CPU), memory 725, an I/O interface 740, and a bus 720. The memory 725 can include local memory employed during actual execution of program code, bulk storage, and cache memories which provide temporary storage of at least some program code in order to reduce the number of times code which are retrieved from bulk storage during execution. In addition, the computing device includes random access memory (RAM), a read-only memory (ROM) and an operating system (O/S).

The computing device 710 is in communication with external I/O device/resource 745 and storage system 750. For example, the I/O device/resource 745 can comprise any device that enables an individual to interact with computing device 710 (e.g., user interface) or any device that enables computing device 710 to communicate with one or more other computing devices using any type of communications link. The external I/O device/resource 745 may be for example, a handheld device, PDA, handset, keyboard etc.

In general, processor 715 executes computer program code (e.g., program control 730), which can be stored in memory 725 and/or storage system 750. Moreover, in accordance with aspects of the disclosure, program control 730 controls a calibration and process correction tool 735, which controls the calibration and process correction to generate the final mask shape of step 195. The calibration and process correction tool 735 can be implemented as one or more program codes in program control 730 stored in memory 725 as separate or combined modules. Additionally, the calibration and process correction tool 735 may be implemented as separate dedicated processors or a single or several processors to provide the function of this tool. While executing the computer program code, the processor 715 can read and/or write data to/from memory 725, storage system 750, and/or I/O interface 740. The program code executes the processes of the disclosure. The bus 720 provides a communications link between each of the components in computing device 710.

The calibration and process correction tool 735 is utilized to model photolithography masks to have free form designs for silicon photonics manufacturing as already described herein. The calibration and process correction tool 735 initiates the calibration process 110 of FIG. 1 to build and calibrate the curvilinear correction model of step 150. The calibration and process correction tool 735 begins the calibration process 110 by defining which test patterns to teach (calibrate) the curvilinear correction model.

At step 115, the calibration and process correction tool 735 collects simple rectilinear test patterns which may be desirable. The calibration and process correction tool 735 then smoothes the collected simple rectilinear test patterns into a curvilinear nature using smoothing algorithms at step 120. The calibration and process correction tool 735 uses smoothing algorithms, including Gaussian convolution algorithms with a B-Spline basis function. In this way, the structures and processes described herein provide for a smoothing of the test patterns using Gaussian convolution algorithms.

In addition to the collection of simple rectilinear designs at step 115, the calibration and process correction tool 735 further collects free form test patterns at step 125 to further teach the curvilinear correction model. In this way, calibrating the machine learning models comprises collecting test patterns at steps 115, 125. Specifically, collecting the test patterns comprises collecting rectilinear and curvilinear designs at steps 115, 125. Further, the structures and processes described herein calibrate machine learning models using the corrected curvilinear test patterns to mimic outputs of the corrected curvilinear test patterns.

At step 130, the calibration and process correction tool 735 takes the smoothed patterns smoothed by the smoothing algorithms of step 120 and the free form test patterns of step 125 and uses them to generate curvilinear test patterns at step 130. More specifically, the calibration and process correction tool 735 generates a design library of curvilinear test patterns from the smoothed patterns smoothed by the smoothing algorithms of step 120 and the free form test patterns of step 125. In this way, the structures and processes described herein generate a design library of curvilinear test patterns for silicon photonics applications.

At step 135, the calibration and process correction tool 735 corrects the curvilinear test patterns to generate a relatively best OPC/process correction model for test patterns. The calibration and process correction tool 735 is configured to apply various corrective techniques. Specifically, the calibration and process correction tool 735 can apply ILT for 2D patterns at step 135a, traditional OPC processes for 1D patterns at step 135b, hybrid OPC processes which comprise a combination of traditional OPC processes and ILT at step 135c, EPC processes comprising bias tables/etch models at step 135d and other correction techniques at step 135e.

Accordingly, the calibration and process correction tool 735 applies the relatively best correction technique depending on the specific curvilinear test pattern from the available correction techniques 135a, 135b, 135c, 135d, 135e. In this way, calibrating the machine learning models further comprises correcting the test patterns by optical proximity correction at step 135b. Alternatively, calibrating the machine learning models further comprises correcting the test patterns by an etch process compensation at step 135d, a hybrid optical proximity correction at step 135c or by an inverse lithography technique at step 135a.

The corrective treatment of the curvilinear test patterns by the calibration and process correction tool 735 results in the test patterns at step 140 having ideal OPC/etch process compensation, i.e., ideal test patterns. The calibration and process correction tool 735 then implements the ideal test patterns of step 140 into a curve transformation model at step 145 to model an ideal output for silicon photonics mask applications. In this way, the structures and processes described herein correct the curvilinear test patterns to compensate for corrections.

In embodiments, the calibration and process correction tool 735 implements various modeling techniques to output the ideal correction model. These techniques include machine learning and etch bias modeling, amongst other examples. In embodiments, etch bias modeling can provide the advantage of being well suited to model the transformation of an input contour to a desired output contour, which is not available in conventional resist models.

The calibration and process correction tool 735 trains the curve transformation model to match ideal curvilinear patterns which have been compensated for OPC and EPC, i.e., treated with correction techniques 135a, 135b, 135c, 135d, 135e. Based on the training at step 145, a curvilinear correction model for ideal mask shapes is generated at step 150. In this way, the curvilinear model is trained using machine learning and the test patterns are compensated by using an optical proximity correction, a hybrid optical proximity correction, an etch process compensation or an inverse lithography.

After completion of the calibration process 110, the calibration and process correction tool 735 implements the process correction flow 160 of FIG. 1. At step 165, the calibration and process correction tool 735 begins with an initial silicon photonics layout, while at steps 170 and 175, the calibration and process correction tool 735 implements a retargeting of the free form designs in the silicon photonics layout by applying the curvilinear correction model to the silicon photonics layout.

The calibration and process correction tool 735 selects which retargeting step to implement based on the corrective technique applied in step 135 of the calibration process 110. For example, if an EPC corrective process was implemented at step 135d, the calibration and process correction tool 735 will retarget the free form designs in the silicon photonics layout using EPC corrective processes. Alternatively, if an OPC corrective process was implemented at step 135b, the calibration and process correction tool 735 will retarget the free form designs in silicon photonics layout by using OPC corrective processes.

If both EPC and OPC corrective processes were applied to the curvilinear correction model, the calibration and process correction tool 735 will implement both retargeting steps 170 and 175 on the free form designs. In further embodiments, the designs are retargeted using oxidation or another non-lithographic compensation. In this way, the retargeting the designs comprises retargeting using a non-lithographic compensation technique or using an optical proximity correction. Further, the retargeting the designs generates a curvilinear mask. In this way, the structures and processes described herein retarget designs in a layout by applying the machine learning models, scan the retargeted designs for unmatching shapes and generate final mask shapes from the retargeted designs.

As already stated, regardless of which retargeting step is selected by the calibration and process correction tool 735, there will be only a need for a single iteration simulation using the curvilinear correction model. For example, if retargeting step 170 is selected, the retargeting which occurs using the curvilinear correction model is performed during a single iteration simulation. Accordingly, because only a single iteration simulation is needed, there is no cost function or convergence criteria, i.e., a relatively very fast simulation time is achieved. The relatively very fast simulation time allows modeling to occur for full chip layouts. Based on the retargeting at steps 170, 175, the calibration and process correction tool 735 generates at step 180 a curvilinear mask shape for ideal mask shapes.

The calibration and process correction tool 735 checks the curvilinear mask shape at step 185 for any weak spots, i.e., non-matching shapes at locations in the curvilinear mask shape. In embodiments, if weak spots are detected by the calibration and process correction tool 735, i.e., "Yes," the calibration and process correction tool 735 implements repair step 190 to repair the weak spots. In this way, the structures and processes described herein provide for repairing the retargeted designs having the unmatching shapes.

In embodiments, the repair process implemented by the calibration and process correction tool 735 is not performed on the entire curvilinear mask shape. Instead, the repair process is applied at a local location where the non-matching (undesirable) shapes are present. After the repair process is completed, or if the curvilinear mask shape did not have any weak spots, i.e., "No," a final mask shape for silicon photonics application is generated by the calibration and process correction tool 735 at step 195.

The structures of the present disclosure can be manufactured in a number of ways using a number of different tools. In general, though, the methodologies and tools are used to form structures with dimensions in the micrometer and nanometer scale. The methodologies, i.e., technologies, employed to manufacture the structures of the present disclosure have been adopted from integrated circuit (IC) technology. For example, the structures are built on wafers and are realized in films of material patterned by photolithographic processes on the top of a wafer. In particular, the fabrication of the structures use three basic building blocks: (i) deposition of thin films of material on a substrate, (ii) applying a patterned mask on top of the films by photolithographic imaging, and (iii) etching the films selectively to the mask.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method, comprising:
    calibrating, by a computing device, machine learning models for silicon photonics applications;
    retargeting, by the computing device, designs in a layout for the silicon photonics applications by applying the machine learning models, including a curvilinear correction model, to the designs to generate retargeted designs;
    scanning, by the computing device, the retargeted designs for unmatching shapes;
    repairing, by the computing device, the unmatching shapes in the retargeted designs; and
    generating, by the computing device, final curvilinear mask shapes, after repairing the unmatching shapes, for the silicon photonics application.

2. The method of claim 1, wherein the calibrating the machine learning models comprises collecting test patterns.

3. The method of claim 2, wherein the collecting the test patterns comprises collecting rectilinear and curvilinear designs.

4. The method of claim 3, wherein the calibrating the machine learning models further comprises correcting the test patterns by optical proximity correction.

5. The method of claim 3, wherein the calibrating the machine learning models further comprises correcting the test patterns by a hybrid optical proximity correction.

6. The method of claim 3, wherein the calibrating the machine learning models further comprises correcting the test patterns by an etch process compensation.

7. The method of claim 3, wherein the calibrating the machine learning models further comprises correcting the test patterns by an inverse lithography technique.

8. The method of claim 1, wherein the retargeting the designs comprises retargeting using a non-lithographic compensation technique.

9. The method of claim 1, wherein the retargeting the designs comprises retargeting using optical proximity correction.

10. The method of claim 1, wherein the retargeting the designs generates a curvilinear mask.

11. The method of claim 1, further comprising smoothing, by the computing device, the test patterns using Gaussian convolution algorithms after collecting the test patterns and before compensating the test patterns, wherein the repairing the unmatching shapes comprises an etch process compensation, wherein the test patterns are corrected using an optical proximity correction, a hybrid optical proximity correction, an etch process compensation or an inverse lithography, wherein the correction is performed as a single iteration simulation process, and wherein the repairing is performed only at locations of the unmatching shapes.

12. A computer program product comprising a computer readable storage medium having program instructions embodied therewith, and the program instructions are readable by a computing device to cause the computing device to:
    generate a design library of curvilinear test patterns for silicon photonics applications;
    correct the curvilinear test patterns to compensate for corrections;
    calibrate machine learning models using the corrected curvilinear test patterns to mimic outputs of the corrected curvilinear test patterns;
    retarget designs including a curvilinear mask in a layout by applying, in a single iteration simulation, the machine learning models, including a curvilinear correction model, to generate retargeted designs including the curvilinear mask;
    scan the retargeted designs for unmatching shapes; and
    repair the unmatching shapes in the retargeted designs to generate final mask shapes from the retargeted designs.

13. The computer program product of claim 12, wherein the test patterns are rectilinear shapes and curvilinear shapes.

14. The computer program product of claim 12, wherein the test patterns are corrected using an optical proximity correction, a hybrid optical proximity correction, an etch process compensation or an inverse lithography.

15. The computer program product of claim 12, wherein the curvilinear model is trained using machine learning.

16. The computer program product of claim 12, wherein the designs are retargeted using oxidation or another non-lithographic compensation.

17. The computer program product of claim 12, further comprising program instructions readable by the computing device to cause the computing device to smooth the test patterns using Gaussian convolution algorithms after collecting the test patterns and before compensating the test patterns, wherein the repairing the retargeted designs having the unmatching shapes is performed only at locations where unmatching shapes are located, and, wherein the test patterns are corrected using an optical proximity correction, a hybrid optical proximity correction, an etch process compensation or an inverse lithography, wherein the correction is performed as a single iteration simulation process, and wherein the repairing is performed only at locations of the unmatching shapes.

18. A system, comprising:
- a CPU, a computer readable memory and a computer readable storage media;
- first program instructions to collect test patterns from a design library;
- second program instructions to compensate the test patterns for corrections;
- third program instructions to train a curvilinear correction model using the compensated test patterns;
- fourth program instructions to retarget designs in a layout by applying, in a single iteration simulation, the curvilinear correction model to the designs to generate retargeted designs including a curvilinear mask;
- fifth program instructions to scan the retargeted designs for unmatching shapes; and
- sixth program instructions to repair retargeted designs containing the unmatching shapes to generate final curvilinear mask shapes, wherein the first, second, third, fourth and fifth program instructions are stored on the computer readable storage media for execution by the CPU via the computer readable memory.

19. The system of claim 18, wherein the test patterns are compensated by using an optical proximity correction, a hybrid optical proximity correction, an etch process compensation or an inverse lithography.

20. The system of claim 18, further comprising seventh program instructions to smooth the test patterns using Gaussian convolution algorithms after collecting the test patterns and before compensating the test patterns, wherein the test patterns, curvilinear correction model and final curvilinear mask shapes are configured for Si photonics applications.

* * * * *